(12) United States Patent
Mukherjee et al.

(10) Patent No.: US 11,948,573 B2
(45) Date of Patent: Apr. 2, 2024

(54) AUTOMATICALLY RECTIFYING IN REAL-TIME ANOMALIES IN NATURAL LANGUAGE PROCESSING SYSTEMS

(71) Applicant: Walmart Apollo, LLC, Bentonville, AR (US)

(72) Inventors: Snehasish Mukherjee, Santa Clara, CA (US); Haoxuan Chen, Mountain View, CA (US); Phani Ram Sayapaneni, Sunnyvale, CA (US); Shankara Bhargava Subramanya, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/977,885

(22) Filed: Oct. 31, 2022

(65) Prior Publication Data

US 2023/0049407 A1    Feb. 16, 2023

Related U.S. Application Data

(63) Continuation of application No. 16/779,280, filed on Jan. 31, 2020, now Pat. No. 11,488,594.

(51) Int. Cl.
*G10L 15/22*   (2006.01)
*G06F 3/16*   (2006.01)
*G10L 15/18*   (2013.01)
*G10L 15/30*   (2013.01)

(52) U.S. Cl.
CPC ............. *G10L 15/22* (2013.01); *G06F 3/167* (2013.01); *G10L 15/1815* (2013.01); *G10L 15/30* (2013.01); *G10L 2015/223* (2013.01)

(58) Field of Classification Search
USPC ...................................... 704/1–504
See application file for complete search history.

(56) References Cited

U.S. PATENT DOCUMENTS

| | | | |
|---|---|---|---|
| 4,914,590 A | 4/1990 | Loatman et al. | |
| 5,428,707 A | 6/1995 | Gould et al. | |
| 7,174,301 B2 * | 2/2007 | Florance | G06Q 30/02 705/28 |
| 7,487,114 B2 * | 2/2009 | Florance | G06Q 50/16 701/438 |
| 7,640,204 B2 * | 12/2009 | Florance | G06Q 50/188 705/28 |
| 8,838,659 B2 * | 9/2014 | Tunstall-Pedoe | G06N 5/02 707/899 |
| 9,098,492 B2 * | 8/2015 | Tunstall-Pedoe | G06F 40/40 |

(Continued)

*Primary Examiner* — Marcus T Riley
(74) *Attorney, Agent, or Firm* — BRYAN CAVE LEIGHTON PAISNER LLP

(57) ABSTRACT

A method for automatically rectifying in real-time anomalies in natural language processing systems. The method can include determining an output corresponding to a user request from a user device for a user based on a new request template or machine learning. The method further can include retrieving one or more entity rules corresponding to entity data of the user request. The method also can include overwriting entity information of the entity data corresponding to the one or more entity rules. Additionally, the method can include outputting the output. Furthermore, the method can include transmitting, to the user device, a response to the user. Other embodiments are disclosed.

20 Claims, 6 Drawing Sheets

(56) References Cited

U.S. PATENT DOCUMENTS

| | | | |
|---|---|---|---|
| 9,786,273 B2 | 10/2017 | Longée et al. | |
| 9,966,065 B2* | 5/2018 | Gruber | G10L 15/28 |
| 9,972,304 B2* | 5/2018 | Paulik | G10L 15/063 |
| 10,049,668 B2* | 8/2018 | Huang | G10L 15/285 |
| 10,067,938 B2* | 9/2018 | Bellegarda | G06F 40/289 |
| 10,089,072 B2* | 10/2018 | Piersol | G10L 25/84 |
| 10,192,552 B2* | 1/2019 | Raitio | G10L 25/18 |
| 10,223,066 B2* | 3/2019 | Martel | G10L 15/22 |
| 10,249,300 B2* | 4/2019 | Booker | G06F 16/3344 |
| 10,269,345 B2* | 4/2019 | Castillo Sanchez | G10L 13/08 |
| 10,297,253 B2* | 5/2019 | Walker, II | G10L 15/1815 |
| 10,311,871 B2* | 6/2019 | Newendorp | G10L 15/32 |
| 10,354,011 B2* | 7/2019 | Nell | G06F 40/35 |
| 10,366,158 B2* | 7/2019 | Bellegarda | G06N 3/02 |
| 10,410,637 B2* | 9/2019 | Paulik | G10L 15/30 |
| 10,417,037 B2* | 9/2019 | Gruber | G06F 9/5005 |
| 10,446,143 B2* | 10/2019 | Akbacak | G06F 40/166 |
| 10,490,187 B2* | 11/2019 | Laurens | G06F 3/167 |
| 10,496,705 B1* | 12/2019 | Irani | H04L 51/18 |
| 10,521,466 B2* | 12/2019 | Bellegarda | G06F 3/16 |
| 10,671,428 B2* | 6/2020 | Zeitlin | G06F 9/4843 |
| 10,691,473 B2* | 6/2020 | Karashchuk | H04W 4/12 |
| 10,733,375 B2* | 8/2020 | Li | G06N 3/042 |
| 10,747,498 B2* | 8/2020 | Stasior | G06F 3/0604 |
| 10,909,331 B2* | 2/2021 | Peitz | G10L 15/1815 |
| 10,958,640 B2* | 3/2021 | Divoux | H04L 63/0815 |
| 11,087,759 B2* | 8/2021 | Lemay | H04L 51/02 |
| 11,126,400 B2* | 9/2021 | Stasior | G10L 15/32 |
| 11,488,594 B2* | 11/2022 | Mukherjee | G06F 16/243 |
| 2005/0273314 A1 | 12/2005 | Chang et al. | |
| 2014/0136188 A1 | 5/2014 | Wroczynski et al. | |
| 2016/0012453 A1 | 1/2016 | Naqvi | |
| 2016/0098992 A1 | 4/2016 | Renard et al. | |
| 2017/0132019 A1* | 5/2017 | Karashchuk | G06F 3/04886 |
| 2017/0132199 A1* | 5/2017 | Vescovi | G06F 3/04842 |
| 2018/0293492 A1 | 10/2018 | Kalamkar et al. | |
| 2019/0080685 A1 | 3/2019 | Johnson, Jr. | |
| 2019/0303442 A1* | 10/2019 | Peitz | G10L 15/1822 |
| 2019/0347668 A1* | 11/2019 | Williams | G06N 5/046 |
| 2019/0349320 A1* | 11/2019 | Karuppusamy | H04L 51/02 |
| 2020/0128051 A1 | 4/2020 | Sondhi | H04L 51/234 |
| 2021/0241758 A1 | 8/2021 | Mukherjee | G06F 3/167 |
| 2023/0049407 A1* | 2/2023 | Mukherjee | G06F 3/167 |

* cited by examiner

400

410 Receiving command data from a user device of a user, the command data corresponding to a user request.

420 Retrieving, from a new template database, a new request template corresponding to the intent data and the entity data.

430 New Request Template Exists?

YES → 440 Retrieving, from the new template database, an output instruction corresponding to the new request template.

NO → 450 Determining, by a machine learning system, the output instruction corresponding to the intent data and the entity data.

460 Transmitting the output instruction to a request processing system to perform the output instruction and transmit, to the user device, a response to the user request.

510 Determining, in real-time after receiving the command data, using automated speech recognition processing, the user request from audio data of command data.

520 Retrieving, from a new pattern database, in real-time after determining the user request from the audio data, a new pattern template corresponding to the user request.

530 When the new pattern template is found, revising the user request based on the new pattern template.

FIG. 5

600
610 Extracting, prior to transmitting the output instruction to the user device, entity information from the entity data.
620 Retrieving, from an entity rule database, one or more entity rules corresponding to the entity data; and
630 When the one or more entity rule are found, overwriting the entity information corresponding to the one or more entity rules.
FIG. 6

AUTOMATICALLY RECTIFYING IN REAL-TIME ANOMALIES IN NATURAL LANGUAGE PROCESSING SYSTEMS

CROSS-REFERENCE TO RELATED APPLICATIONS

This application is a continuation of U.S. patent application Ser. No. 16/779,280, filed Jan. 31, 2020, to be issued as U.S. Pat. No. 11,488,594. U.S. patent application Ser. No. 16/779,280 is incorporated herein by reference in its entirety.

TECHNICAL FIELD

This disclosure relates generally to automatically rectifying in real-time anomalies in natural language processing systems.

BACKGROUND

Natural language processing systems are commonly used in applications such as customer service, chatbots, machine translation, search engines, online or telephonic ordering, or virtual assistants, etc. Many systems with natural language processing or understanding abilities rely on machine learning modules, subsystems, or systems to expand their lexicon and improve accuracy. However, unlike rule-based processing, machine learning takes time. Although anomalies caused by new information, such as new terms or new categories, can be rectified eventually by updating and/or retraining the machine learning model, before the model can be updated or retrained, users of the natural language processing systems can encounter incorrect and inconsistent results, which can damage the user experience. Therefore, a mechanism for rectifying anomalies in real-time that is easy to implement yet effective is desired.

BRIEF DESCRIPTION OF THE DRAWINGS

To facilitate further description of the embodiments, the following drawings are provided in which:

FIG. 4 illustrates a flow chart for a method for automatically rectifying in real-time anomalies in natural language processing systems, according to an embodiment;

FIG. 5 illustrates a flow chart for a method of automatically recognizing speeches including a real-time anomalies rectification mechanism, according to another embodiment; and FIG. 6 illustrates a flow chart for a method of automatically interpreting entity data including a real-time anomalies rectification mechanism, according to another embodiment.

Figure 1:
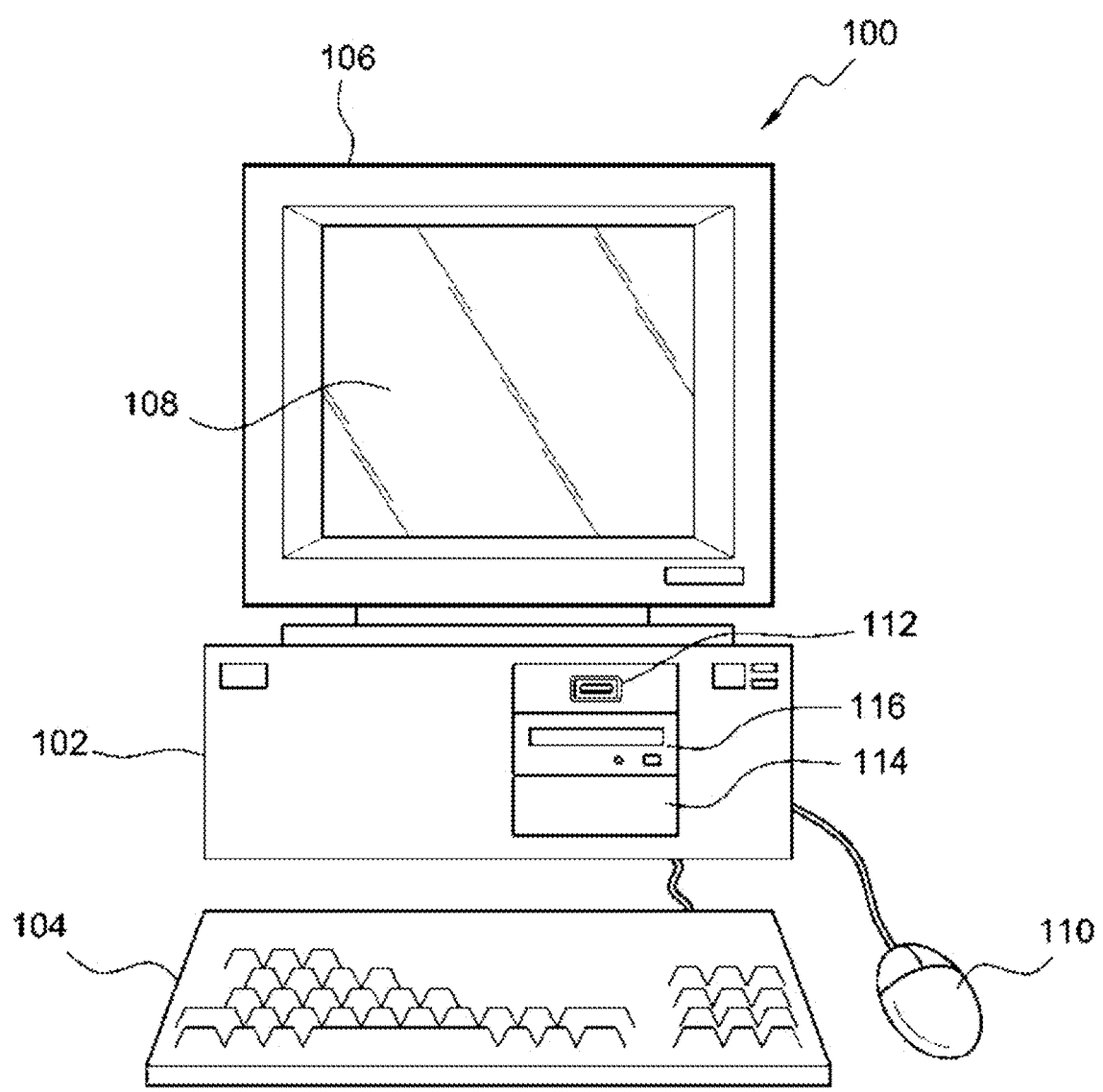
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

DESCRIPTION OF EXAMPLES OF EMBODIMENTS

Figure 2:
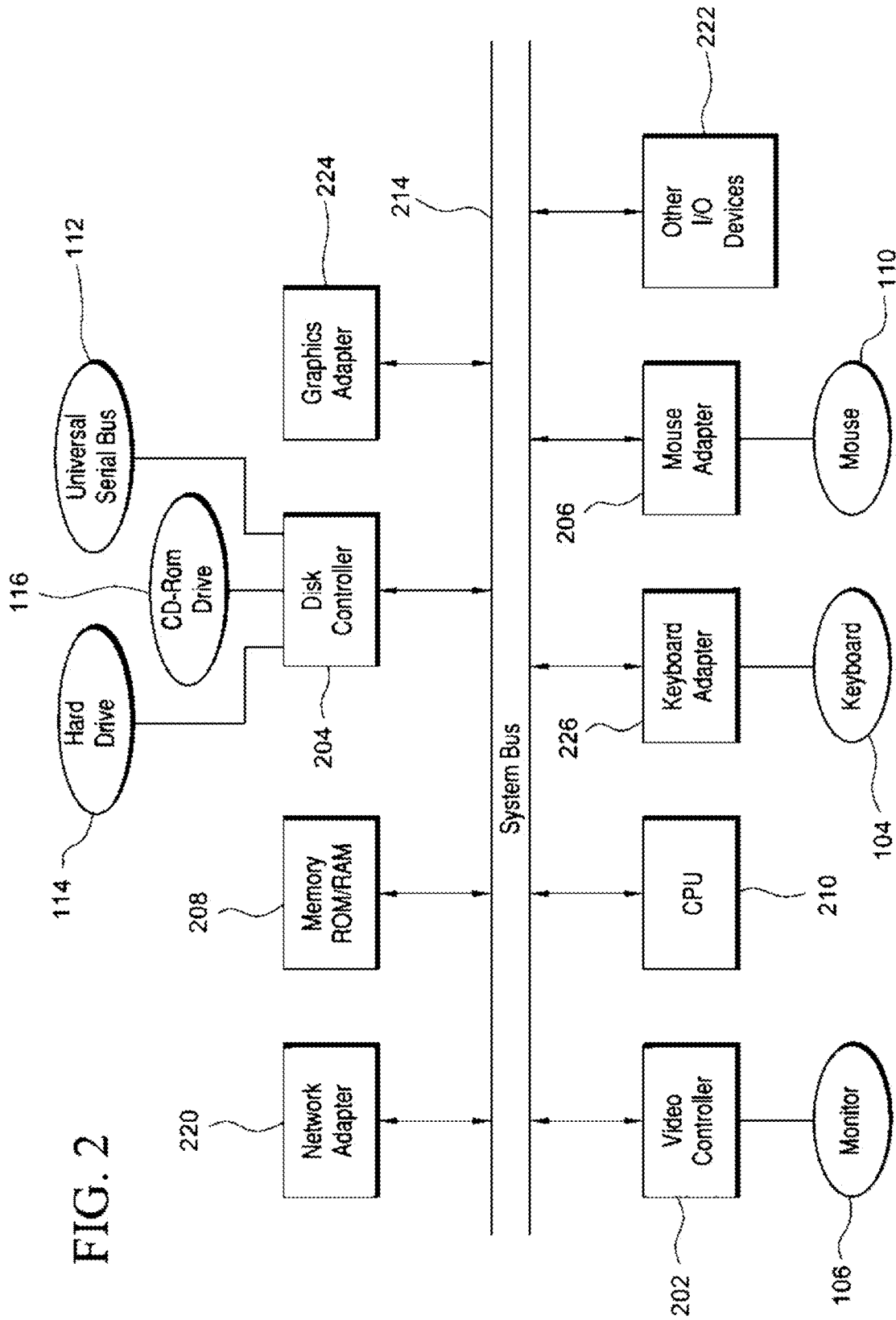
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
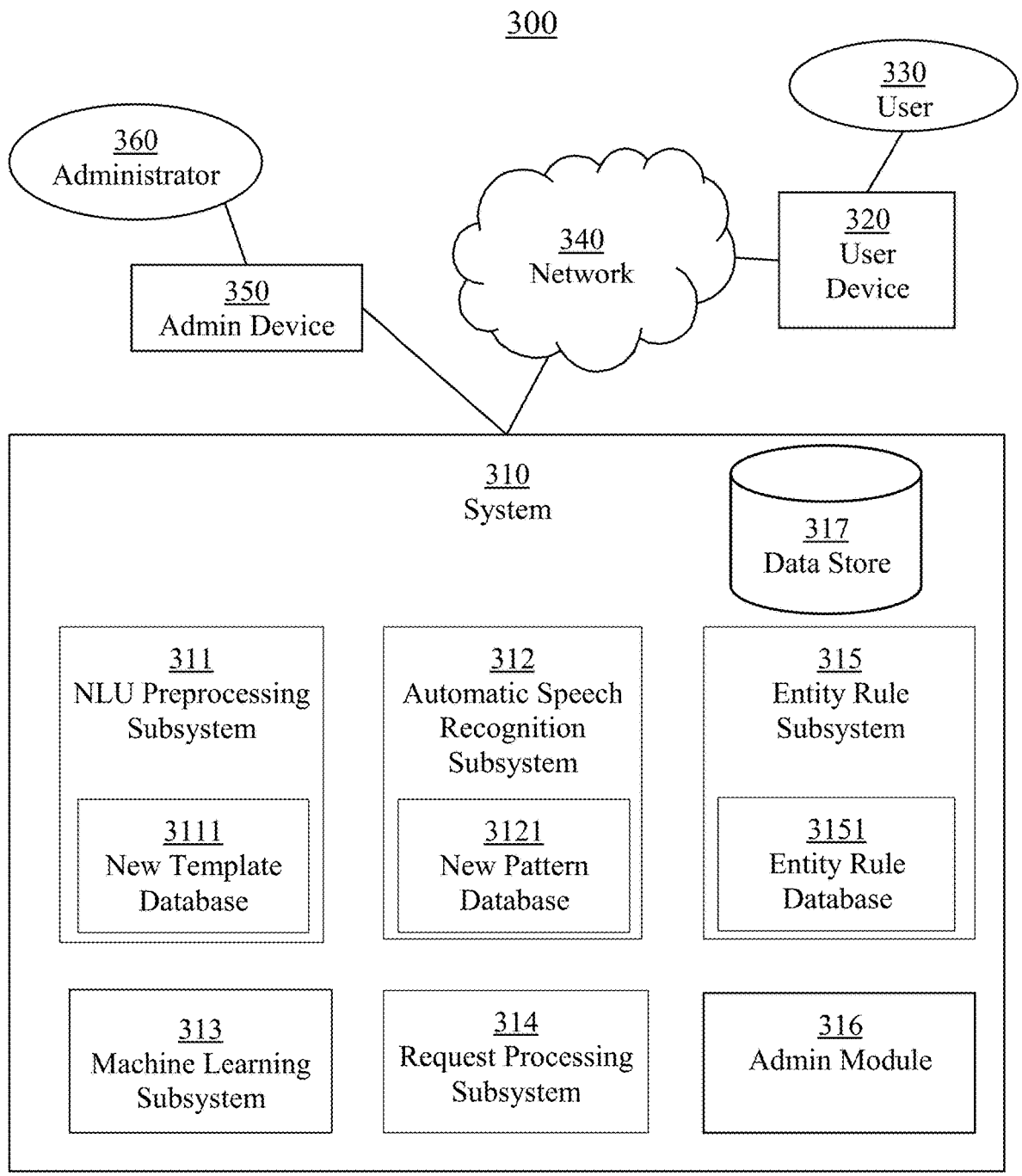
FIG. 3 illustrates a block diagram of a system that can be employed for automatically rectifying in real-time anomalies in natural language processing systems, according to an embodiment.

Turning ahead in the drawings, FIG. 3 illustrates a block diagram of a system 300 that can be employed for automatically rectifying in real-time anomalies in natural language processing systems, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., a system 310) and one or more devices (e.g., a user device 320 and/or an administrator (admin) device 350). In a number of embodiments, system 310 can include one or more modules, subsystems, systems, and/or servers, such as one or more Natural Language Understanding (NLU) preprocessing subsystems (e.g., 311), one or more Automatic Speech Recognition (ASR) subsystems (e.g., 312), one or more Machine Learning (ML) subsystems (e.g., 313), one or more request processing subsystems (e.g., 314), one or more entity rule subsystems (e.g., 315), and/or one or more administrator (admin) modules (e.g., 316).

System 300, system 310, NLU preprocessing subsystem 311, ASR subsystem 312, ML subsystem 313, request processing subsystem 314, entity rule subsystem 315, admin module 316, and/or user device 320 can each be a computer system, such as computer system 100 (FIG. 1), as described above, and can each be a single computer, a single server, or a cluster or collection of computers or servers, or a cloud of computers or servers. In another embodiment, a single computer system can host each of system 300, system 310, NLU preprocessing subsystem 311, ASR subsystem 312, ML subsystem 313, request processing subsystem 314, entity rule subsystem 315, admin module 316, and/or user device 320. In many embodiments, system 310 can be modules of computing instructions (e.g., software modules) stored at non-transitory computer readable media that operate on one or more processors. In other embodiments, system 310 can be implemented in hardware. Additional details regarding system 310, NLU preprocessing subsystem 311, ASR subsystem 312, ML subsystem 313, request processing subsystem 314, entity rule subsystem 315, admin module 316, and/or user device 320 are described herein.

In some embodiments, system 310 can be in data communication, through a computer network, a telephone network, or the Internet (e.g., network 340), with user device 320. In some embodiments, user device 320 can be used by users, such as user 330. In a number of embodiments, system 310 can host a website, or provide a server that interfaces with an application (e.g., a mobile application or a web browser), on user device 320, which can allow user 330 to browse and/or search for items (e.g., products), to add items to an electronic cart, and/or to purchase items, in addition to other suitable activities. In a number of embodiments, system 310 can host a voice-based e-commerce system (e.g., automated telephone ordering system, or ordering system using a voice assistant), or provide a server that interfaces with an audio communication application, on user device 320, which can allow user 330 to search for items (e.g., products), to inquire as to order status and/or other general questions (e.g., item information, store hours, promotions, etc.), to add items to an electronic cart, and/or to purchase items via speech, in addition to other suitable activities. In many embodiments, the voice assistant can run on user device 320. The voice assistant can be Amazon Alexa on the Amazon devices (e.g., Amazon Echo), Siri on Apple devices (e.g., iPhone), Google Assistant on Google-enabled devices (e.g., Google Home) and Android devices, Bixby on Samsung devices (e.g., Galaxy), Cortana on Microsoft-enabled devices (e.g., computers running Microsoft Windows OS), and/or another suitable voice assistant.

In some embodiments, an internal network (e.g., 340) that is not open to the public can be used for communications between system 310 and user device 320 within system 300. In these or other embodiments, an operator and/or an administrator (e.g., an administrator 360) of system 310 can manage system 310, including NLU preprocessing subsystem 311, ASR subsystem 312, ML subsystem 313, request processing subsystem 314, entity rule subsystem 315, and/or admin module 316, the processor(s) of system 310, and/or the memory storage unit(s) of system 310 using the input device(s) and/or display device(s) of system 310 or via one or more admin devices (e.g., 350) coupled, through an internal network (not shown), to an administrator module (e.g., 316).

In certain embodiments, the user device (e.g., 320) can be desktop computers, laptop computers, a mobile device, and/or other endpoint devices used by one or more users (e.g., 330). In some embodiments, administrator devices (e.g., 350) can be desktop computers, laptop computers, a mobile device, and/or other endpoint devices used by one or more administrators (e.g., 360). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., a database 317, a new template database 3111, a new pattern database 3121, and an entity rule database 3151). The one or more databases can include a product database that contains information about products, items, or SKUs (stock keeping units), for example, including attribute names and attribute values, among other information, as described below in further detail. The one or more databases further can include one or more template rule database configured to store rules to rectify various system anomalies, as described below in further detail. The one or more databases can be stored on one or more memory storage units (e.g., a volatile memory or non-transitory computer readable media), which can be similar or identical to the one or more memory storage units (e.g., RAM or non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases (e.g., 317, 3111, 3121, and 3151) can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, and/or the one or more databases (e.g., 317, 3121, 3131, and 3151) can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, NLU preprocessing subsystem 311 can include a real-time anomaly rectification mechanism configured to: (a) identify a known issue(s) associated with a user request received from a user device (e.g., 320) of a user (e.g., 330), via a network (e.g., 340); (b) bypass the ordinary NLU processing path in system 310; and/or (c) interpret the user request and generate an output instruction, based at least in part on one or more new request templates associated with the user request from new template database 3111.

In a number of embodiments, ASR subsystem 312 can determine, in real-time after receiving the command data including audio data, the user request from the audio data. In many embodiments, ASR subsystem 312 can be implemented with hardware and/or software using one or more of statistically-based speech recognition algorithms, including hidden Markov models (HMI), dynamic time warping, neural networks, recurrent neural networks, deep feedforward neural network (DNN), connectionist temporal classification (CTC)-based end-to-end automatic speech recognition, or attention-based end-to-end automatic speech recognition, etc. In some embodiments, ASR subsystem 312 further can automatically correct known misclassification(s), potential or existing, in the user request, as determined by ASR subsystem 312, based on one or more entity rules in new pattern database 3121.

In some embodiments, ML subsystem 313 can interpret a user request in natural language and generate intent data and entity data from the user request accordingly. ML subsystem 313 can be implemented with hardware and/or software adopting one or more of NLU algorithms, such as Support Vector Machines (SVM), Bayesian Networks, Neural Networks, or Deep Learning, etc., and can constantly improve and automate the text interpretation process. In many embodiments, system 310 can generally use ML subsystem 313 for NLU processing and generating the intent data, the entity data, and/or the output instruction. In some embodiments, when system 310 and/or an operator/administrator (e.g., 360) of system 310 observes one or more misclassifications, potential or existing, in the outputs of ML subsystem 313, system 310 and/or administrator 360 can create one or more new request templates and allow NLU preprocessing subsystem 311 to take over NLU processing according to the new request template(s), as stated above.

In some embodiments, request processing subsystem 314 can perform the output instruction and transmit, to user device 320, a response to the user request. As an example, when the user request includes an audio inquiry, such as "When will the Black Friday sales start?," the output instruction, as determined by ML subsystem 313 or NLU preprocessing subsystem 311, can comprise a command to play an audio message with a predetermined answer, and/or request processing subsystem 314 can comprise a server configured to stream the audio message to user 330, via user device 320 through network 340. In another example, the output instruction can include a request to process a payment authorization, and request processing subsystem 314 can host a transaction server configured to process the payment and return the result of the payment transaction.

In certain embodiments, entity rule subsystem 315 can analyze the entity data and generate entity information based on the entity data. In a number of embodiments, entity rule subsystem 315 also can determine that at least some entity information, as generated, can contain some known issue(s), and/or entity rule subsystem 315 can overwrite the entity information corresponding to one or more entity rules in entity rule database 3151.

In a number of embodiments, admin module 316 can receive and/or process commands from an administrator 360. In many embodiments, admin module 316 can provide a user interface to allow administrator 360 to observe the status, logs, inputs, and/or outputs, etc. of one or more of system 310, NLU preprocessing subsystem 311, ASR subsystem 312, ML subsystem 313, request processing subsystem 314, and/or entity rule subsystem 315. In many embodiments, admin module 316 also can provide a user interface to allow administrator 360 to manage, create, delete, or revise, via admin device 350 through wire or wireless connection (not shown), one or more data records in one or more databases, including database 317, new template database 3111, new pattern database 3121, and/or entity rule database 3151. For example, admin module 316 can provide a user interface for administrator 360 to create, delete, or edit one or more of new request templates in new template database 3111, new pattern templates in new pattern database 3121, or entity rules in entity rule database 3151.

In some embodiments, new template database 3111, new pattern database 3121, and/or entity rule database 3151 each can be an in-memory database and stored in the RAM (e.g. 208 (FIG. 2)) or flash memory of at least one of: system 310, NLU preprocessing subsystem 311, ASR subsystem 312, or entity rule subsystem 315, etc. In certain embodiments, new template database 3111, new pattern database 3121, and/or entity rule database 3151 each can be stored in RAM and can be periodically persisted and/or backed up to one or more of non-transitory computer readable media, such as a hard drive (e.g., 114 (FIG. 1)). In a number of embodiments, new template database 3111, new pattern database 3121, and/or entity rule database 3151 each can be stored in flash memory and can be loaded, in whole or in part, to the RAM in system 310, NLU preprocessing subsystem 311, ASR subsystem 312, and/or entity rule subsystem 315 for processing, at a suitable frequency, such as every 5 minutes, or 10 minutes, etc.

In a number of embodiments, new request templates in new template database 3111, new pattern templates in new pattern database 3121, and entity rules in entity rule database 3151 each can be deleted by administrator 360 via admin device 370 and admin module 314 or automatically by system 310 under certain conditions. For example, a condition can be when one or more of: ASR subsystem 312, ML subsystem 313, or entity rule subsystem 315 has/have learned the pattern(s) of new inputs and generated acceptable outputs.

Conventional systems are unable to at least automatically rectify in real-time anomalies in natural language processing (NLP) systems, other than to always wait until the machine learning module learns to recognize the new pattern or information and the correct response to such pattern/information, which can take hours if not days to happen, because conventional systems typically lack a by-pass mechanism to timely rectify the misclassification(s), potential or existing, and respond based on rules or templates. In many embodiments, real-time anomalies rectification modules provided by system 300, system 310, and/or NLU preprocessing subsystem 311 can advantageously address the problem by automatically determining whether ML subsystem 313 can likely misclassify a user request based on whether a corresponding rule/template exists, and can at least bypass ML subsystem 313 while using the corresponding rule/template in new template database 3111 to analyze the user request. Additionally, in many embodiments, the techniques provided herein are easy to implement, fast, and effective.

Turning ahead in the drawings, FIG. 4 illustrates a flow chart for a method 400 of automatically rectifying in real-time anomalies in NLP systems, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), system 310 (FIG. 3), NLU preprocessing subsystem 311 (FIG. 3), ASR subsystem 312 (FIG. 3), ML subsystem 313 (FIG. 3), request processing subsystem 314 (FIG. 3), and/or entity rule subsystem 315 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 310 (FIG. 3), NLU preprocessing subsystem 311 (FIG. 3), ASR subsystem 312 (FIG. 3), ML subsystem 313 (FIG. 3), request processing subsystem 314 (FIG. 3), and/or entity rule subsystem 315 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of receiving command data from a user device of a user. In a number of embodiments, the command data can correspond to a user request. Examples of user requests can include a specific query, such as a question regarding the price of an item or the items added to the electronic cart; a frequently asked question (FAQ) such as a question regarding delivery fees or weekly promotions; and/or an instruction, such as to add an item to the electronic cart or to check out.

Method 400 also can include a block 420 of retrieving, from a new template database (e.g., 3111 (FIG. 3)), a new request template corresponding to the user request. In some embodiments, the new template database can comprise one or more new frequently-asked-questions (FAQ) templates or patterns and one or more corresponding new FAQ answers.

In some embodiments, when the one or more new FAQ templates comprise the new request template and the one or more corresponding new FAQ answers, the one or more corresponding new FAQ answers can comprise the output instruction corresponding to the new request template.

For example, a new request template for a new FAQ can comprise one or more new FAQ templates, as the following exemplary regular expressions:
45 What are Cyber Monday deals?
@template-Cyber_Monday_deals:
~(?=.*?\bwhat|where\b) (?=.*?\bcyber monday\b) (?=.*?\bdeal(s)\b).*s
@template-Cyber_Monday_deals: ~(?=.*?\bshowb) (?=.*?\bcyber monday\b) (?=.*?\bdeal(s)\b).*s For the same example, the new template database also can comprise one or more new FAQ answers corresponding to the new request template for "What are Cyber Monday deals?", as the following exemplary regular expression:
what_are_Cyber_Monday_deals?=Visit walmart.com for details on Cyber Monday. Deals officially start the Monday following Thanksgiving, on December $2^{nd}$.

In some embodiments, a new request template can comprise one or more new patterns without any corresponding answers in the new template database, or vice versa.

In a number of embodiments, the new template database (e.g., 3111 (FIG. 3)) accessed in block 420 can be an in-memory database and/or can be stored in a memory data store, such as a RAM or a flash memory. In some embodiments, block 420 can be configured to periodically, at a frequency, load or refresh a portion of or the entire new template database to be processed in one or more of the blocks 410-460 of method 400. In several embodiments, the frequency can be at least as great as a predetermined frequency threshold, such as every 3 minutes, 5 minutes, or 15 minutes, etc.

Method 400 further can include a block 430 of determining whether the new request template corresponding to the user request exists in the new template database (e.g., 3111 (FIG. 3)).

Method 400 also can include a block 440 of retrieving, from the new template database (e.g., 3111 (FIG. 3)), an output instruction corresponding to the new request template, when the new request template is found. In some embodiments, block 440 further can include extracting, using NLU processing, intent data and entity data from the user request and merging the intent data and/or entity data into the output instruction. The NLU processing in block 420 can be performed by system 300 (FIG. 3), system 310 (FIG. 3), and/or NLU preprocessing subsystem 311 (FIG. 3).

Method 400 additionally can include a block 450 of determining, by a machine learning system, the output instruction corresponding to the user request, when the new request template is not found. The machine learning system can be similar or identical to system 300 (FIG. 3), system 310 (FIG. 3), and/or ML subsystem 313 (FIG. 3).

Moreover, method 400 can include a block 460 of transmitting the output instruction to a request processing system to perform the output instruction and transmit, to the user device, a response to the user request. The request processing system can be similar or identical to system 300 (FIG. 3), system 310 (FIG. 3), and/or request processing subsystem 314 (FIG. 3).

Turning ahead in the drawings, FIG. 5 illustrates a flow chart for a method 500 of automatically recognizing speeches including a real-time anomalies rectification mechanism, according to the embodiment of FIG. 4. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In some embodiments, system 300 (FIG. 3), system 310 (FIG. 3), and/or ASR subsystem 312 (FIG. 3) can be suitable to perform method 500 and/or one or more of the activities of method 500. In many embodiments, method 500 can be performed after block 410 (FIG. 4).

Referring to FIG. 5, method 500 can include a block 510 of determining, in real-time after receiving the command data, using automated speech recognition (ASR) processing, the user request from audio data of the command data. In some embodiments, the command data can comprise utterances by a user (e.g., 330 (FIG. 3)) transmitted via a telephone or a voice-based computer application (App), such as a voice assistant. In some embodiments, the ASR processing in block 510 can be performed by a machine learning module trained to recognize speeches or utterances by users.

Method 500 further can include a block 520 of retrieving, from a new pattern database (e.g., 3121 (FIG. 3)), in real-time after determining the user request from the audio data, a new pattern template corresponding to the user request. In some embodiments, the ASR processing in block 510 can be known to often misclassify some words that sound similar, such as "car," "cart," and "card." As such, in a number of embodiments, block 520 can confirm whether a misclassification in at least a part of the user request is known or likely, and whether a solution can be provided in the new pattern database by searching for a new pattern template corresponding to the user request from the new pattern database.

In many embodiments, the new pattern database (e.g., 3121 (FIG. 3)) can be an in-memory database stored in RAM or flash memory. In some embodiments, block 520 additionally can include loading or refreshing at least a portion of the new pattern database at a frequency at least as great as a predetermined threshold, such as every 5 minutes, 7 minutes, or 10 minutes.

Method 500 also can include 530 of revising the user request based on the new pattern template, when the new pattern template is found in the new pattern database (e.g., 3121 (FIG. 3). As an example, when a portion of the user request originally recognized as "make it to" can be corrected to be "make it two," the new pattern template can be represented by a regular expression as below:

@template-make_it_two; (?<prefix>(.*?))( )? \bmake\b (?<body>(.*?)) to(o)?

The corresponding answer/correction can be:

make_it_two=<prefix>\make\<body>\two

Turning ahead in the drawings, FIG. 6 illustrates a flow chart for a method 600 of automatically interpreting entity data including a real-time anomalies rectification mechanism, according to another embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In some embodiments, system 300 (FIG. 3), system 310 (FIG. 3), and/or ASR subsystem 312 (FIG. 3) can be suitable to perform method 600 and/or one or more of the activities of method 600. In some embodiments, system 300 (FIG. 3), system 310 (FIG. 3), and/or entity rule subsystem 315 (FIG. 3) can be suitable to perform method 600 and/or one or more of the activities of method 600. In many embodiments, method 600 can be performed before block 460 (FIG. 4).

Referring to FIG. 6, method 600 can include a block 610 of extracting, prior to transmitting the output instruction to the user device, entity information from the entity data. Exemplary entity data can include one or more of a unit (e.g., "pound", "inch(es)," or "feet"), a brand, an item (e.g., product), an item type, a quantity, and so forth.

In many embodiments, the entity rule database can be an in-memory database stored at the RAM, flash memory, or other volatile/nonvolatile memory, etc. and can be loaded to or refreshed at a main memory where method 600 is executed every 3 minutes, 5 minutes, 12 minutes, etc.

Method 600 also can include a block 620 of retrieving, from an entity rule database (e.g., 3151 (FIG. 3)), one or more entity rules corresponding to the entity data.

Method 600 also can include a block 630 of overwriting the entity information corresponding to the one or more entity rules, when the one or more entity rules are found.

For instance, when a user request, "add X Y Z," includes a new item "X Y Z," block 610 that can be implemented by a module, subsystem, or system, such as NLU subsystem 311 (FIG. 3) or ML subsystem 313 (FIG. 3), can extract from the entity data, "X Y Z," the entity information as: {"quantity": ["X"], "unit": ["Y"], "item": ["Z"]}.

If an operator or an administrator (e.g., 360 (FIG. 3)) or a system (e.g., system 300 or system 310) knows that the new item will launch soon (e.g., when a record for the new item is added to an item database but before an ML module for ASR can be trained) or observes that this new entity has been searched for or requested by users (e.g., 330 (FIG. 3)) but block 610 has been incorrect classify the entity "X Y Z", a new entity rule as below can be added to the entity rule database:

{template-add: (?<product>XYZ)}

As soon as the new entity rule is added (or after loading the entity rule database, as updated), block 620 can determine that "X Y Z" is a new entity, and block 630 can then overwrite the entity information identified by block 610.

In many embodiments, the techniques described herein can provide a practical application and several technological improvements. In some embodiments, the techniques described herein can provide for automatically rectifying in real-time anomalies in natural language processing systems. Additionally, the techniques described herein can be easy to implement yet effective. These techniques described herein can provide a significant improvement over conventional approaches of relying machine learning modules in natural language processing systems to eventually correct the anomalies that can be ineffective and cannot meet the demand of timeliness for online systems, such as e-commerce platforms or search engines, because the learning process can take hours or days.

In a number of embodiments, the techniques described herein can solve a technical problem that arises only within the realm of computer networks, as natural language processing and/or natural language understanding do not exist outside the realm of computer systems/networks. Moreover, the techniques described herein can solve a technical problem that cannot be solved outside the context of computer systems/networks. Specifically, the techniques described herein cannot be used outside the context of computer systems/networks, in view of a lack of data.

Various embodiments can include a system including one or more processors and one or more non-transitory computer-readable media storing computing instructions configured to run on the one more processors and perform certain acts. The acts can include receiving command data from a user device of a user. The command data can correspond to a user request. The acts also can include retrieving, from a new template database, a new request template corresponding to the user request.

The acts further can include retrieving, from the new template database, an output instruction corresponding to the new request template, when the new request template is found. Additionally, the acts can include determining, by a machine learning subsystem, the output instruction corresponding to the user request, when the new request template is not found. Moreover, the acts can include transmitting the output instruction to a request processing subsystem. The request processing subsystem can be configured to perform the output instruction and transmit, to the user device, a response to the user request.

A number of embodiments can include a method being implemented via execution of computing instructions configured to run at one or more processors and stored at one or more non-transitory computer-readable media. The method can include receiving command data from a user device of a user. The command data can correspond to a user request. The method further can include retrieving, from a new template database, a new request template corresponding to the user request.

Additionally, the method can include retrieving, from the new template database, an output instruction corresponding to the new request template, when the new request template is found. The method further can include determining, by a machine learning system, the output instruction corresponding to the user request, when the new request template is not found. The method also can include transmitting the output instruction to a request processing system. The request processing system can be configured to perform the output instruction and transmit, to the user device, a response to the user request.

Various embodiments further can include a system including one or more processors and one or more non-transitory computer-readable media storing computing instructions that, when executed on the one or more processors, perform certain acts. The acts can include determining an output corresponding to a user request from a user device for a user based on a new request template or machine learning. In many embodiments, the acts further can include retrieving one or more entity rules corresponding to entity data of the user request. The acts also can include overwriting entity information of the entity data corresponding to the one or more entity rules. The acts further can include outputting the output. Moreover, the acts can include transmitting, to the user device, a response to the user.

Various embodiments additionally can include a method being implemented via execution of computing instructions configured to run at one or more processors and stored at one or more non-transitory computer-readable media. The method can include determining an output corresponding to a user request from a user device for a user based on a new request template or machine learning. The method further can include retrieving one or more entity rules corresponding to entity data of the user request. The method in addition can include overwriting entity information of the entity data corresponding to the one or more entity rules. The method also can include outputting the output. Furthermore, the method can include transmitting, to the user device, a response to the user.

Although the methods described above are with reference to the illustrated flowcharts, it will be appreciated that many other ways of performing the acts associated with the methods can be used. For example, the order of some operations may be changed, and some of the operations described may be optional, skipped or altered.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically rectifying anomalies in NLP/NLU systems has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders. As another example, one or more of the procedures, processes, and/or activities of one of FIGS. 4-6 can be performed in another one of FIGS. 4-6. As another example, the modules, systems, and/or subsystems within system 300, system 310, NLU preprocessing subsystem 311, ASR subsystem 312, ML subsystem 313, request processing subsystem 314, entity rule subsystem 315, and/or admin module 316 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, perform:
      determining an output corresponding to a user request from a user device for a user based on a new request template or machine learning;
      retrieving one or more entity rules corresponding to entity data of the user request;
      overwriting entity information of the entity data corresponding to the one or more entity rules;
      outputting the output; and
      transmitting, to the user device, a response to the user.

2. The system in claim 1, wherein:
   when the new request template corresponding to the user request is found among one or more new FAQ templates in a new template database, determining the output corresponding to the user request further comprises retrieving the output from one or more new FAQ answers corresponding the one or more new FAQ templates in the new template database.

3. The system in claim 1, wherein:
   the new request template is retrieved from an in-memory new template database.

4. The system in claim 3, wherein the computing instructions, when executed on the one or more processors, further perform:
   loading at least a portion of the in-memory new template database at a frequency; and
   the frequency is at least as great as a predetermined frequency threshold.

5. The system in claim 1, wherein the computing instructions, when executed on the one or more processors, further perform:
   determining, using automated speech recognition processing, the user request based on audio command data received from the user device.

6. The system in claim 5, wherein determining the user request based on the audio command data further comprises:
   revising the user request based on a new pattern template corresponding to the user request.

7. The system in claim 6, wherein:
   the new pattern template is stored in an in-memory new pattern database.

8. The system in claim 1, wherein the computing instructions, when executed on the one or more processors, further perform:
   receiving, from a user interface executed on an admin device, an admin command associated with a second new request template; and
   performing, after receiving the admin command, the admin command associated with the second new request template.

9. The system in claim 1, wherein:
   the one or more entity rules are stored in an in-memory entity rule database.

10. The system in claim 9, wherein the computing instructions, when executed on the one or more processors, further perform:
    loading at least a portion of the in-memory entity rule database at a frequency; and
    the frequency is at least as great as a predetermined frequency threshold.

11. A method being implemented via execution of computing instructions configured to run at one or more processors and stored at one or more non-transitory computer-readable media, the method comprising:
    determining an output corresponding to a user request from a user device for a user based on a new request template or machine learning;
    retrieving one or more entity rules corresponding to entity data of the user request;
    overwriting entity information of the entity data corresponding to the one or more entity rules;
    outputting the output; and
    transmitting, to the user device, a response to the user.

12. The method in claim 11, wherein:
    when the new request template corresponding to the user request is found among one or more new FAQ templates in a new template database, determining the output corresponding to the user request further comprises retrieving the output from one or more new FAQ answers corresponding the one or more new FAQ templates in the new template database.

13. The method in claim 11, wherein:
    the new request template is retrieved from an in-memory new template database.

14. The method in claim 13 further comprising:
    loading at least a portion of the in-memory new template database at a frequency, wherein:
    the frequency is at least as great as a predetermined frequency threshold.

15. The method in claim 11 further comprising:
    determining, using automated speech recognition processing, the user request based on audio command data received from the user device.

16. The method in claim 15, wherein determining the user request based on the audio command data further comprises:
    revising the user request based on a new pattern template corresponding to the user request.

17. The method in claim 16, wherein:
    the new pattern template is stored in an in-memory new pattern database.

18. The method in claim 11 further comprising:
    receiving, from a user interface executed on an admin device, an admin command associated with a second new request template; and
    performing, after receiving the admin command, the admin command associated with the second new request template.

19. The method in claim 11, wherein:
    the one or more entity rules are stored in an in-memory entity rule database.

20. The method in claim 19 further comprising:
loading at least a portion of the in-memory entity rule database at a frequency, wherein:
the frequency is at least as great as a predetermined frequency threshold.

\* \* \* \* \*